Dec. 25, 1951 R. W. RIGGS 2,579,757

VISIBLE CARD INDEX

Filed April 30, 1946 2 SHEETS—SHEET 1

INVENTOR
Robert W. Riggs
BY [signature]
ATTORNEY

Dec. 25, 1951

R. W. RIGGS 2,579,757

VISIBLE CARD INDEX

Filed April 30, 1946

2 SHEETS—SHEET 2

INVENTOR
Robert W. Riggs
BY
[signature]
ATTORNEY

Patented Dec. 25, 1951

2,579,757

UNITED STATES PATENT OFFICE 2,579,757

VISIBLE CARD INDEX

Robert W. Riggs, Stamford, Conn., assignor to Remington Rand Inc., Buffalo, N. Y., a corporation of Delaware Application April 30, 1946, Serial No. 665,974

1 Claim. (Cl. 129—16.7)

This invention relates to card indexes and particularly to a visible card index adapted for indexing and controlling the distribution of magazines.

The invention provides an index card or supplemental card for each issue of a periodical publication or other article to be distributed at intervals, so that a single supplemental card may be used to identify one issue of a magazine for distribution to a given number of distribution stations. The entire record of distribution is made on this distribution or supplemental card for a given issue. Provision is made for assembling a plurality of these distribution or supplemental cards in a card holder in superimposed relation over an index card containing an index on one margin designating the distribution stations for the several distribution entries made on each supplemental card to obtain a consolidated record. A consolidated distribution record for several issues provides a convenient means for estimating the number of copies of a magazine or other publication or article, to be distributed to the indexed stations, so that an excessive supply at any station or series of stations may be avoided. This enables a distributor to handle a number of copies, limited to nearly the estimated number to be sold, so that dealers are not overstocked, a supply may be maintained by the distributor for quick delivery to stations running short of copies, and yet reduce to a minimum the possibility of a dealer losing sales because copies are exhausted, without substantially exhausting the original copy supply and thereby avoid leftover copies to be returned to the publisher.

The invention provides for a magazine or publication index in which the distribution or supplemental cards are individualized by an indexing signal to distinguish one series from a subsequent series by arranging the indexing signal in different positions on the supplemental cards in successive order, according to the index on the margin of the index card, while different groups of cards in the same series are differentiated by variations in the character of the signal, such as through the use of different colors.

The invention further comprehends the provision of an index for keeping records of magazine distribution and the like, in which the distribution or supplemental cards are detachably engaged in retaining means carried by a card holder in superimposed edge-to-edge relation over an index card in each holder at one side of an indexed margin on said index card, so that a series of adjacent, aligned distribution or supplemental cards are arranged in shiftable relation to the index on the index card. The index on the index card serves to index the information on a group of supplemental cards in operating the record. New supplemental cards are inserted for current records, as needed.

The invention provides a card holder for use in providing a visible index adapted to be hingedly mounted on a suitable support along one margin with a suitable retaining means for an index card, while the opposite free margin carries a transparent sheath for receiving an index card in superimposed relation with a visible margin engaged in said sheath and the opposite marginal portion engaged with the retaining means adjacent the hinge portion of the card holder. A second sheath is adapted to be engaged in embracing relation over the margin of the index card, adjacent the hinge portion of the card holder, with the ends of the sheath detachably engaged with retaining means on the card holder adjacent the hinge portion. These sheaths provide a means for detachably supporting a plurality of supplemental cards in superimposed relation on the index card at one side of an indexed margin thereon, and in edge-to-edge relation with corresponding portions on each supplemental card arranged in aligned relation with an index on the index card. Then, with the use of appropriate signalling means on each supplemental card, different series of supplemental cards are distinguished from one another by the indexed position of the signal being in different positions on cards of different series, while variations in the character of the signal are used to distinguish different groups of cards in the same series. In addition, by having the printed lines defining blank entry spaces on the opposite faces of each supplemental card in different colors, or with other suitable distinguishing means, each side of each supplemental card may be used to receive a record in the operation of the index.

This invention provides a card index having the advantages of more accuracy by elimination of transcription errors, of completeness by having all information recorded in one group on a distribution or supplemental card eliminating collateral records, and time saving because transcription to and use of collateral records is eliminated.

Figure 1:
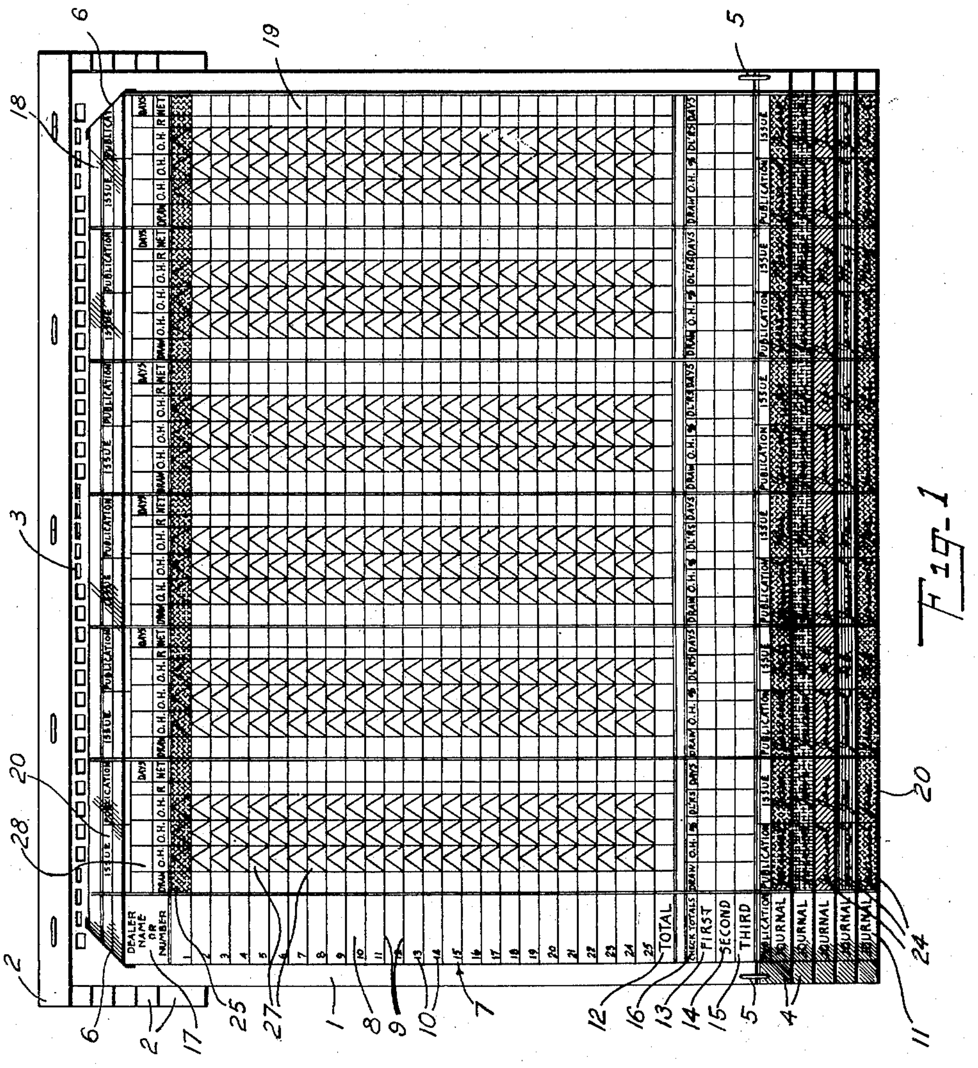
Fig. 1 shows a plurality of card holders arranged in offset overlapping relation with the free margins of each card holder in visible relation with the index and supplemental cards in the uppermost card holder of the series illustrated in assembled relation thereon, in plan view.
Figure 6:
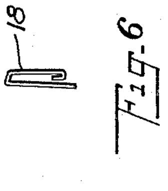
Fig. 6 shows one of the sheaths in end elevation.

This invention is particularly adapted for use in a visible index. Only the portion of a visible index necessary to an understanding of the invention is illustrated and described. A plurality of visible index card holders are illustrated in Fig. 1 in offset overlapping relation with a free margin of each arranged in visible relation in the usual manner. Each card holder includes a sheet 1 secured to a supporting lug 2 along one margin. Each card holder is adapted for hinging movement relative to the supporting lug along a line of perforations 3 adjacent the lug. The opposite or free margin of sheet 1 has a transparent sheath 4 embracing the free margin and secured thereto by a plurality of wire stitches indicated at 5, in a manner well-known in the art. The shape of both sheaths herein described is shown in Fig. 6. One or more cards may be engaged over the front and rear portions of sheet 1 under the embracing portion of sheath 4, so that an index placed on the margin of the card engaged in the sheath, will be protected thereby and be visible therethrough. The usual card holder has sheet 1 provided with one or more diagonal slots, such as indicated at 6, which are adapted to receive the corners of one or more index cards at the edge adjacent hinge 3. In this way, an index card having a size slightly smaller than that of sheet 1, will have one margin engaged in sheath 4 and the opposite corners engaged in diagonal corner slots 6.

Figures 2, 3, 4:
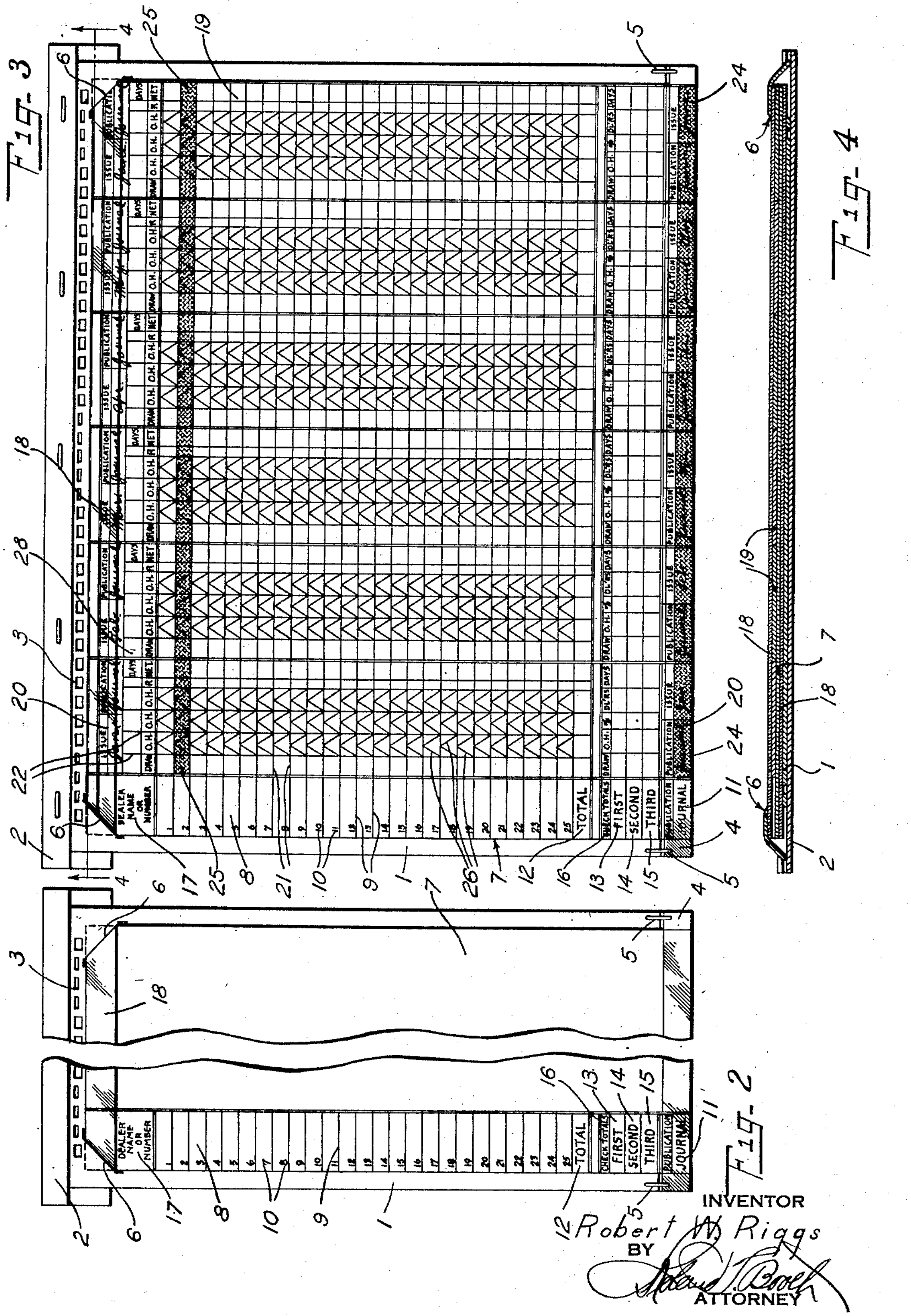
Fig. 2 is a plan view of one card holder with the index card in assembled relation thereon and without the supplemental cards, the central portion being broken away.
Fig. 3 is a view of a single card holder similar to the upper card holder shown in Fig. 1 and illustrates an index card and an assembled series of supplemental cards mounted thereon, showing supplemental cards having the index signal in the second indexed position, as distinguished from the cards illustrated in Fig. 1 having the index signal in the first position.
Fig. 4 is a cross section taken on line 4—4 of Fig. 3.

The present invention employs a record card 7 having one margin engaged in sheath 4 and the corners of the opposite margin engaged in corner slots 6, as clearly shown in Fig. 2. The left-hand margin of each index card 7 is provided with an indexed margin on the left-hand side, as shown in Fig. 2 and indicated at 8. This margin 8 is provided with a plurality of horizontal lines 9 dividing the major portion of the card margin between the top and bottom into indexed sections identified by suitable indicia, such as numerals indicated at 10. The indexed sections formed by lines 9 are also adapted to receive letter or name indicia in addition to indexing numerals 10 for additionally indexing the records in the card holders.

The lower portion of indexed margin 8 is normally engaged in the transparent sheath 4 of the card holder and is visible in the manner illustrated in Fig. 1 to provide an appropriately designated section for receiving a visible index for the card, indicated at 11. The disclosure herein is directed particularly to illustrating the application of the present invention to an index for articles periodically distributed, such as monthly magazines. The word "Publication" is printed in section 11 to designate that it is adapted for receiving an entry identifying the particular magazine indexed on the card 7. The word "Journal" is written in section 11 to illustrate the indexing of a magazine, such as the "Ladies' Home Journal." A series of appropriately designated spaces are provided between the lowermost line 9 and index section 11, which includes space 12 provided with the printed designation "Total" for indicating a line of columns for receiving total figures in sections indexed by the numeral index 10. Then, three appropriately designated sections 13, 14 and 15 containing the words, "First," "Second" and "Third," respectively, are appropriately designated by the words "Check totals" indicated at 16, for a purpose that will be hereinafter described. The top portion of indexed margin 8, indicated at 17, is adapted to receive an appropriate designation indicating the nature of the index to be placed in the sections formed by lines 9 and as illustrated in the drawings, includes the words "Dealer name or number."

A second sheath 18 of the cross sectional form shown in Fig. 6, and made from a folded strip of transparent material, is engaged over the upper margin of index card 7 to embrace the marginal portion thereof adjacent hinge 3 with opposite ends engaged through diagonal slots 6 in sheet 1. Index card 7 cooperates with sheath 18 for detachably holding it interengaged in slots 6 of the card holder.

Figure 5:
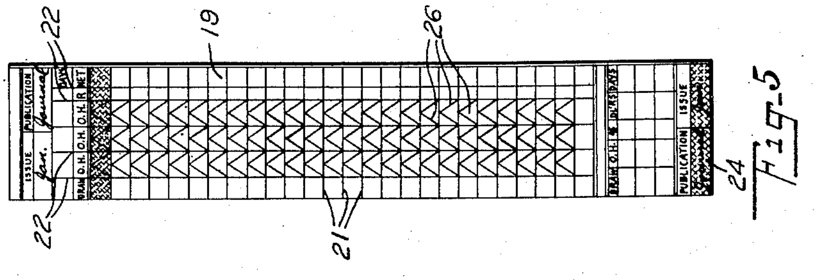
Fig. 5 is a plan view of an individual supplemental card.

A plurality of supplemental or distribution cards 19, one of which is shown in detail in Fig. 5, are mounted in edge-to-edge relation and superimposed on index card 7 to the right of indexed margin 8, as shown in Figs. 1 and 3. Six supplemental cards 19 are illustrated in the drawings in Figs. 1 and 3, arranged to fill the space from the right-hand edge of indexed margin 8 to the right-hand portion of the card holder. The upper and lower ends of each supplemental card 19 are engaged in sheaths 18 and 4 respectively, for detachably retaining the several supplemental cards in superimposed relation on index card 7 with the upper and lower ends of each supplemental card terminating in coincident relation with the upper and lower edges of index card 7. Cards 19 have the same dimension from top to bottom as index card 7, but are of less width.

In employing supplemental cards 19 in a publication index for periodical magazines, each card is arranged to carry the information regarding one issue of the publication. By using both sides of each card 19 with six supplemental cards in each card holder, as illustrated in Figs. 1 and 3, it will be understood that the records of a year's issue of a monthly publication may be kept on the six supplemental cards 19 in one card holder. For this purpose, the top and bottom margin of each supplemental card 19 is provided with appropriately designated sections indicated at 20 to receive the name of the publication and the issue to be recorded on a particular card. The drawings show the cards indexed for the publication known as the "Journal" and the issues identified as those from January to June inclusive on one side of each of the six cards shown in Figs. 1 and 3. The opposite sides of these same six cards are used to index the issues of the same publication for the months of July to December, inclusive. One side of each card has appropriately designated sections printed thereon with one color of ink and the opposite side of each card has the same printed arrangement using a different color of ink. In this way, one color may be used for one period, such as the first six months of a year, and the other color for the last half of the year.

Each card is provided with a series of spaced horizontal ruled lines 21 dividing the major portion of each supplemental card between top and bottom margins into a plurality of sections for receiving entries in horizontal alignment with sections indexed at 10 on indexed margin 8 provided by horizontal lines 9. The lines 21 on all supplemental cards 19 are in horizontally aligned and registering relation with each other and lines 9 on indexed margin 8, in the manner shown in Fig. 1. In this way, indexed margin 8 indexes the entries made in the appropriately designated sections on each supplemental card 19. Horizontal sections are also provided in alignment with the appropriately designated sections 12, 13, 14, 15 and 16 by ruling the lower end portions of the supplemental cards in a manner corresponding with that of indexed margin 8, in the manner shown in Figs. 1 and 3. Each supplemental card 19 is provided with vertical ruled lines 22 in spaced parallel relation to divide the horizontal sections formed by lines 21 into a series of columns. These rulings 22 provide six columns of entry sections on each supplemental card in horizontal aligned relation with corresponding sections designated by numeral index 10 on indexed margin 8. The left-hand column has an appropriate designation indicated by the word "Draw" printed at the top. The second, third and fourth columns each contain the printed designation "O. H.," an abbreviation for the words "On hand." The fifth column contains the letter "R" and the sixth column, the word "Net."

In distributing a periodical publication, such as a magazine, the publisher usually sends a quantity of magazines to a distributor for a selected area, who in turn distributes these magazines to a series of retail stations where they are sold to the public. Each index card 7 is provided with appropriately designated sections formed by horizontal lines 9 to index 25 stations or dealers. If a distributor has more than 25 dealers who retail to the public within his area, he obviously will require more than one index card 7 for each publication distributed. In such a case, two or more index cards 7 are used according to the number of dealers or distribution stations. The second index card will therefore have the sections formed by lines 9 indicated by a different set of numerals in numeral index 10, such as the numerals 26 to 50, in order that the dealers may be indexed in numerical order on two index cards 7.

For a larger distribution list, additional cards employing a numeral index 10 of the proper numerical order will be used so that all of the dealers for the entire index will be serial numbered on one or more index cards 7. When there are in excess of 100 dealers, requiring more than four index cards 7 in order to cover the distribution by a distributor of one or more magazines or other publications, the present invention provides for using duplicate cards for indexing a second series of distribution outlets or dealers indexed in the same order as the first 100 dealers. If additional index space is required, then a third series of cards indexed in the same manner, is used. In order to distinguish the second and subsequent series of indexed dealers from the first series, the invention provides for the provision of an indexing signal that will distinguish each set of cards of the first series from each of the other sets of cards of additional series of 100 dealers. For this purpose, each supplemental card is provided with color banded portions at 24 and 25 respectively, the portion 24 being the bottom marginal portion of each supplemental card normally arranged in visible relation in the card holder in the manner illustrated in Fig. 1. The color banded portion 25 for the first series of supplemental cards, covers the area formed by the first horizontal section formed by the top lines 21 and indexed by the numeral 1 of the numerical index 10 on index margin 8.

A different color is used for each different group of supplemental cards in the first series, as shown in Fig. 1, with the color bands 25 on all of the cards of the different groups in the series arranged in the first position, as shown in Fig. 1. With the index illustrated, there are four groups of supplemental cards mounted in four card holders to cover the first series, thereby using four different colors for indexing the different groups of supplemental cards in the first series.

For the second and subsequent series, the same colors are used for corresponding groups in each series. However, to differentiate one series of supplemental cards from another, the position of the color band 25 is changed on the supplemental cards in each series. For example, in the second series, the same colors will be used for corresponding groups of cards, as used in the first series, but the position of the color bands 25 will be moved down one section, or placed in the second position indexed by numeral 2 of numeral index 10, as shown in Fig. 3. Successive series will use the next successive position to the preceding series. The visible margins of all of supplemental cards 19 will have colored marginal portions, as illustrated at 24. These color bands at 24 and 25 are applied to both sides of each card 19 in order to properly index each card in each and all series so that misfiling of any supplemental card will be immediately indicated by the signal, particularly that shown by color band 25.

The second, third and fourth columns, designated by the title "O. H." at the top, have the sections within the columns formed by horizontal lines 21, divided by diagonal lines 26 into a plurality of triangles. As shown in the drawings, each section designated by a pair of spaced parallel lines 21 within the second, third and fourth columns from the left-hand edge of each card 19, is divided into three triangles, upper left and right right-angle triangles and a center isoceles triangle. This division of the second, third and fourth columns on each supplemental card 19 facilitates the keeping of an efficient record, when used in connection with the distribution of monthly magazines.

When a magazine issued monthly is to be distributed, the distributor, from previous records of distribution to each dealer carried by the several supplemental cards in a card holder, listed and identified by the index on margin 8 of each index card, can estimate the number of magazines to be distributed for a current issue to each dealer to effect the best and most economical distribution of magazines for the first period of selling. With a monthly publication, a dealer customarily checks at the end of each week, after the first distribution of copies of a current magazine issue. In the first left-hand column for a current issue of a magazine under the heading "Draw," is entered the estimate of the number of magazines each dealer will sell during the entire period of distribution for the current issue. With a monthly magazine, this covers a period of about one month. Therefore, the anticipated sales of each dealer are entered in the first left-hand column on supplemental card 19 for the issue of the publication identified at the top and bottom of the card and indicated at 20.

The distributor then has a check-up made at the end of each week after this first delivery, or at some other periodic interval. Prior to each of these check-ups, the distributor estimates the number of unsold magazines which should be on hand at each dealer's place of business. For the first check-up he enters this figure in the upper left triangle of each space under the first column headed "O. H.," as indicated at 27 in Fig. 1. The distributor or his employee then counts the actual number of copies on hand at each dealer's stand and enters this figure in the large center triangle of the "O. H." column. A comparison of the estimated quantity against the actual quantity indicates whether it is necessary to leave additional copies or whether some of the copies on hand may be removed. In case of leaving additional copies or removing copies from those on hand, an entry is made in the upper right-hand triangle of the column marked "O. H." indicating by plus or minus sign, the number of additional copies left or the number of on-hand copies removed. In this way, magazines may be removed from dealers where they are slow selling and added to the stock of magazines in dealer locations where they are selling faster, in order to obtain a substantially complete filling of all requests for the particular publication issue with a limited number of copies.

The purpose of the present distribution index is to facilitate maximum distribution with a limited number of articles through a plurality of stations in order to reduce the number of left-overs after a given lapse of time. The column headed "R" on each supplemental card 19 is for the entry of the number of magazines returned from each dealer at the end of the distribution period. This is the number of issues of the indexed publication left on hand in each dealer's place of business which are picked up by the distributor, after a given lapse of time. The net sale of the issue of the publication recorded on each supplemental card 19 may then be entered in the right-hand column under the word "Net." The number of days covered by the period of distribution may be entered in the blank sections arranged in horizontal alignment at the top of each supplemental card 19 and indicated by numeral 28. At the right-hand end of these sections indicated at 26, is the word "Days" providing for space to enter the date or the number of days between each check-up so that the total period of time covered by the distribution of the issue of the publication recorded on each supplemental card 19 may be recorded.

All of the information for all of the dealers may be totaled at the bottom of each supplemental card 19 in the appropriately designated sections opposite sections 12, 13, 14 and 15, respectively.

With the present index, it will be seen that each issue of a publication may be recorded and totaled for 25 dealers on one supplemental card 19. Two or more supplemental cards 19 are used in the same position in succeeding card holders for more than 25 dealers in a manner that will be clear from the above description in connection with the distribution of a single issue of a publication. The records for six issues are always visible in the card holder with the cards constructed as described and illustrated in the drawings. The supplemental card for recording the distribution of a current issue is usually placed at the right-hand side of a card holder, as illustrated in Fig. 1, while the five supplemental cards 19 to the left of the right-hand card, will contain the distribution records for the five previous issues. This provides for the convenient estimating of the draw for a current issue. After the record of each issue is completed, the left-hand card in each card holder is removed, the remaining supplemental cards are moved toward the left in each card holder and a new supplemental card for the current issue inserted at the right-hand side of each card holder, as shown in Fig. 1. It will be understood that the index will be repeated for each publication which a distributor handles. These will be placed in the visible index in alphabetical order so that a separate distribution record is kept for each publication, usually covering the same list of dealers identified by index card 7 along indexed margin 8 thereof.

For the present index construction, it will be understood that while the invention has been described for use in recording the distribution of a periodical publication, such as a monthly magazine, that it may be used for many other purposes to index the distribution of one or more articles to a series of stations, within the scope of the invention, as herein disclosed. For example, the present index would be adapted for keeping efficient records on the distribution of articles sold in vending machines. In using the present index, the color bands 25 on each supplemental card will identify the position of the card in the index and signal misfiling, due to the difference of color used on different groups of cards 19 in the same series and the different positions of the color bands in different series. It will be seen that when properly filed, the color bands 25 on one series of cards in a card holder will be in horizontal alignment in the same position and display a continuity of the same color in the same position across both the top and bottom portions of the assembled cards in a card holder, as clearly shown in Fig. 1. The index margin 8 on index card 7 provides a complete index in each card holder for the supplemental cards carried thereby and eliminates the necessity of repeatedly writing indexes for the entries made on the supplemental cards. In this way, a minimum of manually written entries is required for keeping a record of the distribution of articles to a series of stations, while at the same time providing a substantial amount of indexed information that may be periodically changed to add supplemental cards 19 for receiving new indexes that may be compared with previously entered information on the adjacent supplemental cards, thereby materially facilitating the distribution of articles such as the current issues of a publication, to a plurality of stations for distribution.

The different positions and colors of the bars on the supplemental cards, enable these cards to be removed from the index for billing, check-ups and returns, when they are placed in other carrying or holding devices in an indexed arrangement different from that illustrated. In this different arrangement, the color bars in each position identify the corresponding supplemental cards of each series of dealers by being horizontally aligned when assembled.

The invention claimed is:

In a visible index, the combination of a card holder having a supporting sheet adapted for hinging movement relative to said holder along a line of perforations adjacent one margin, formed with diagonal corner slots at opposite ends of said sheet adjacent said margin and having a transparent sheath embracing and attached to the opposite margin, an index card having one margin engaged in said sheath, and a second sheath embracing the margin of said index card opposite said one margin detachably engaging in said corner slots therewith at opposite ends.

ROBERT W. RIGGS.

REFERENCES CITED

The following references are of record in the file of this patent:

UNITED STATES PATENTS

| Number | Name | Date |
|---|---|---|
| 1,559,459 | Rogers | Oct. 27, 1925 |
| 1,626,027 | Daniels | Apr. 26, 1927 |
| 2,253,630 | Lapper | Aug. 26, 1941 |
| 2,254,889 | Doebler | Sept. 2, 1941 |